June 30, 1970    V. M. ALEXANDRINO ET AL    3,517,489

MACHINE FOR HARVESTING SUGAR CANE

Filed Oct. 13, 1967            4 Sheets-Sheet 1

INVENTORS.
VICTOR M. ALEXANDRINO,
JOSE HAROLD ACEVEDO GUARDIOLA,
BY
Berman, Davidson & Berman
ATTORNEYS.

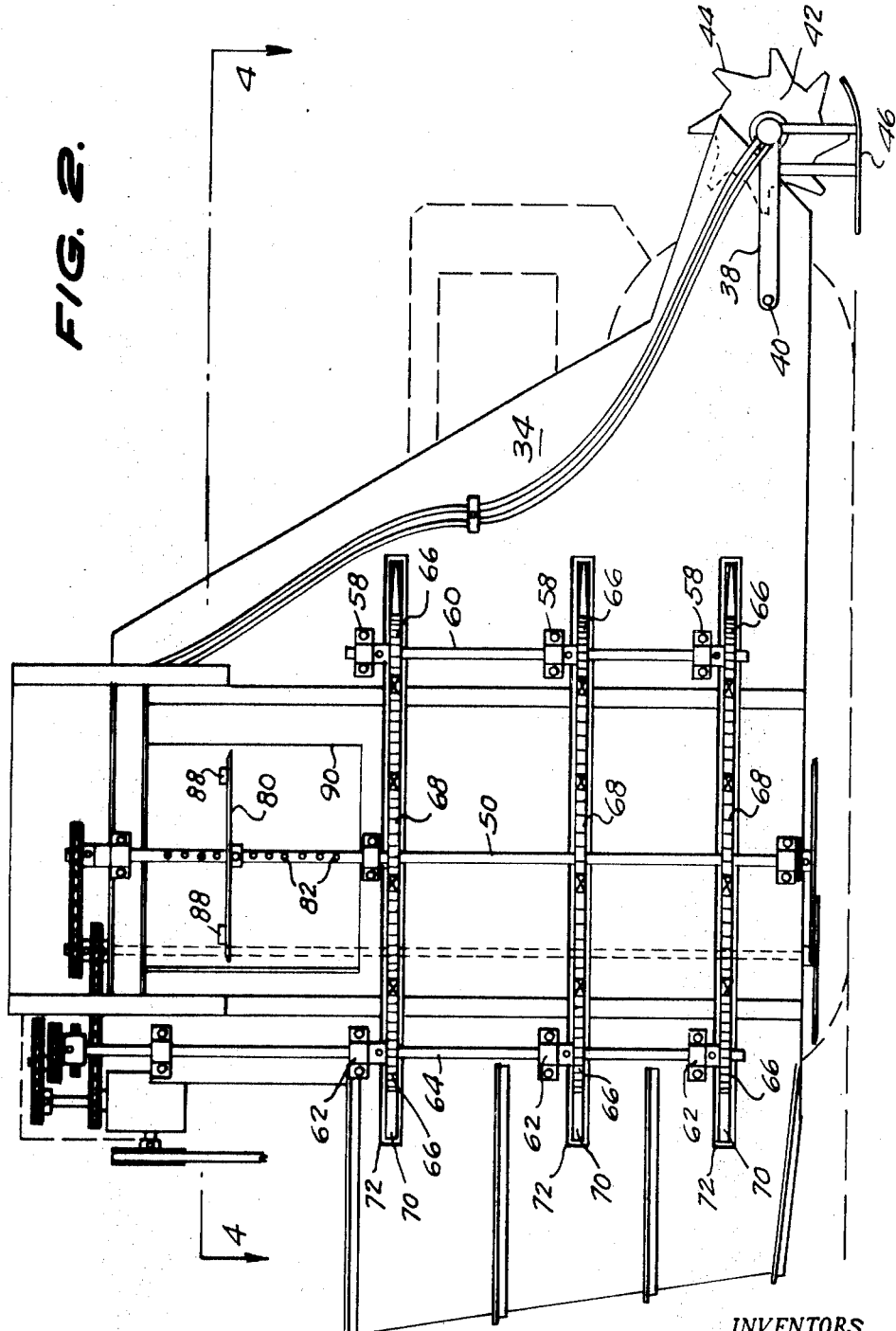

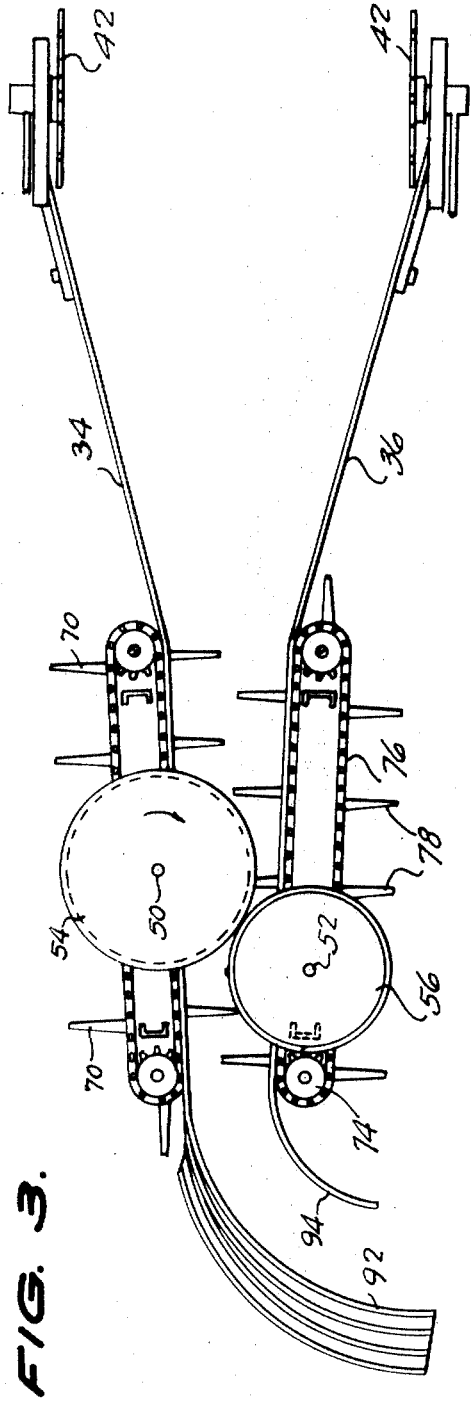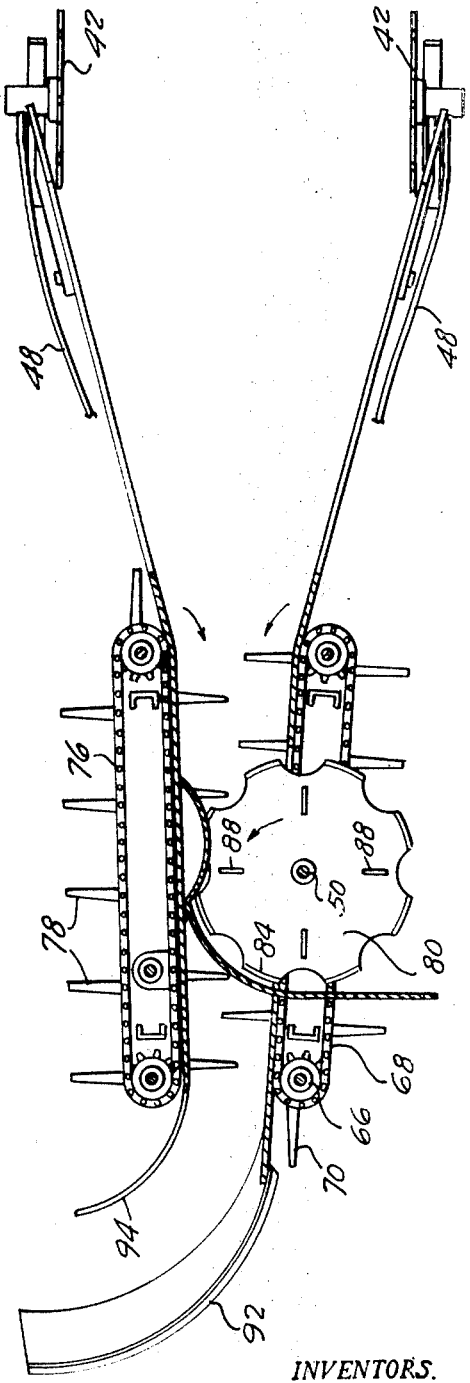

INVENTORS.
VICTOR M. ALEXANDRINO,
JOSE HAROLD ACEVEDO GUARDIOLA,
BY
Berman, Davidson & Berman
ATTORNEYS.

United States Patent Office 3,517,489
Patented June 30, 1970

3,517,489
MACHINE FOR HARVESTING SUGAR CANE
Victor M. Alexandrino, P.O. Box 405, Fajardo, Puerto Rico 00648, and Jose Harold Acevedo Guardiola, Derrisol 1149, Levittown, Puerto Rico 00632
Filed Oct. 13, 1967, Ser. No. 675,182
Int. Cl. A01d *45/02*
U.S. Cl. 56—17                                                8 Claims

ABSTRACT OF THE DISCLOSURE

Cane harvesting machine for mounting on a tractor comprising a frame; overlapping knives rotatable about vertical axes mounted in said frame and operating very near ground level; means for raising and lowering said frame with said knives; sets of spaced opposed, horizontal conveyors mounted in said frame and overlying said knives; a second knife above said conveyors, and toothed cane lifting wheels mounted on horizontal axes in advance of said first-named knives.

---

It is an object of this invention to provide a cane harvesting machine which not only will sever the cane at ground level but will trim the cane tops to produce cane of full and uniform length and will discharge the stalks, severed and topped, so that these may be picked up by means of conventional equipment.

It is a further object of this invention to produce a cane harvesting machine as aforesaid in which the severed tops of the canes are delivered out of the path occupied by the severed cane stalks so as not to hinder the stalk gathering operations.

It is a further object of this invention to provide a cane harvesting machine as aforesaid with means operative in advance of the machine to bring to substantially erect condition, such stalks as may have been bent over to ground level so that these bent stalks may be gathered into the machine and severed like normally upstanding stalks.

It is a further object of this invention to provide a machine as aforesaid in which the ground level cane cutters may be hydraulically adjusted to operate the whole unit as closely as possible to the ground and in which the top cutter is adjustable so as to produce a uniform length of cane for any particular harvesting job.

In general, it is an object of this invention to provide a portable machine which is light, sturdy, hydraulically adjustable to various types of cane and terrain. Moreover, the machine will cut whole lengths of cane without bruising, has rotary means to lift fallen stalks into cutting position and affords a simple means of laying cut stalks on the ground for gathering by conventional means.

Figure 1:
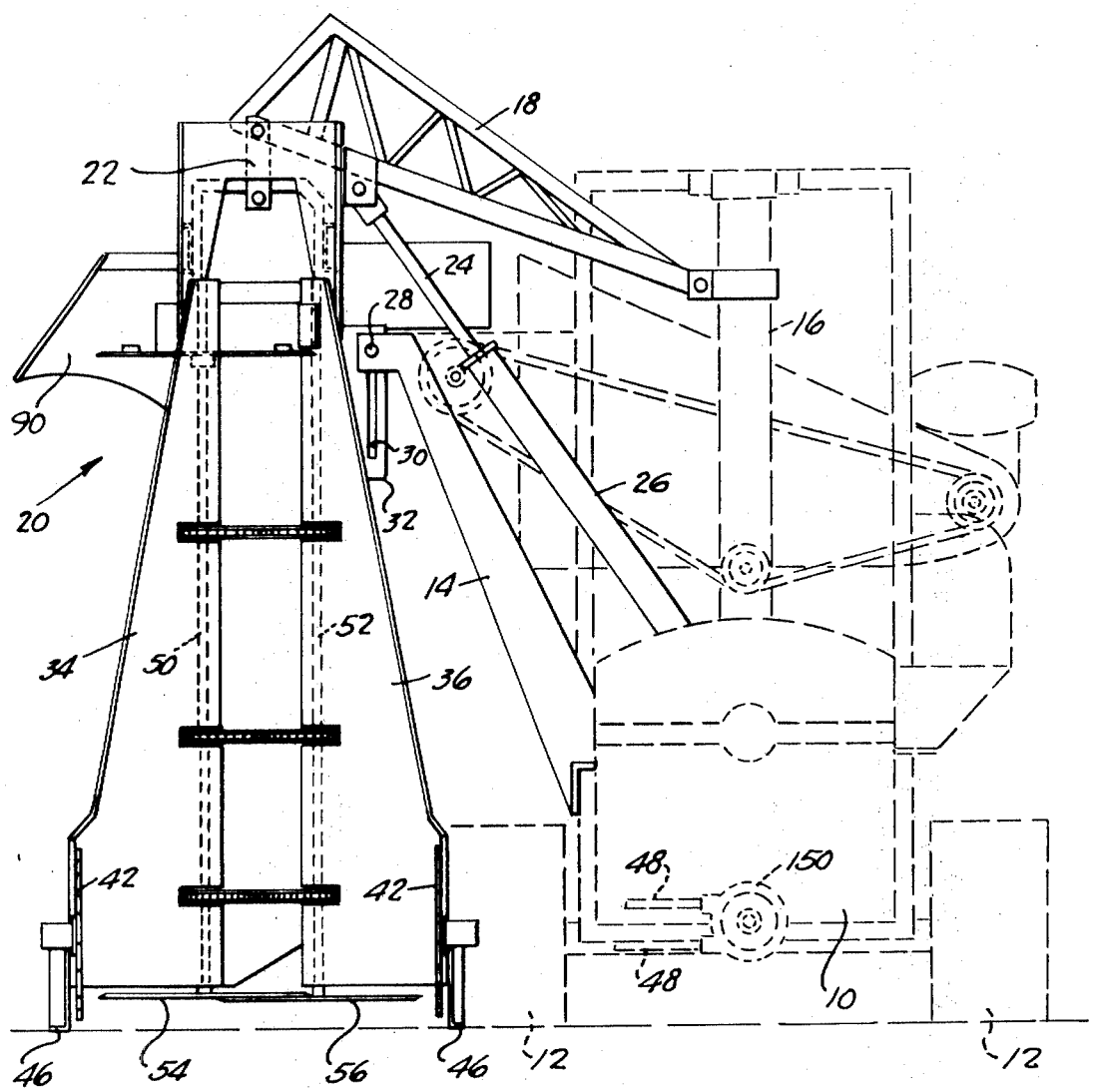
Figure 5:
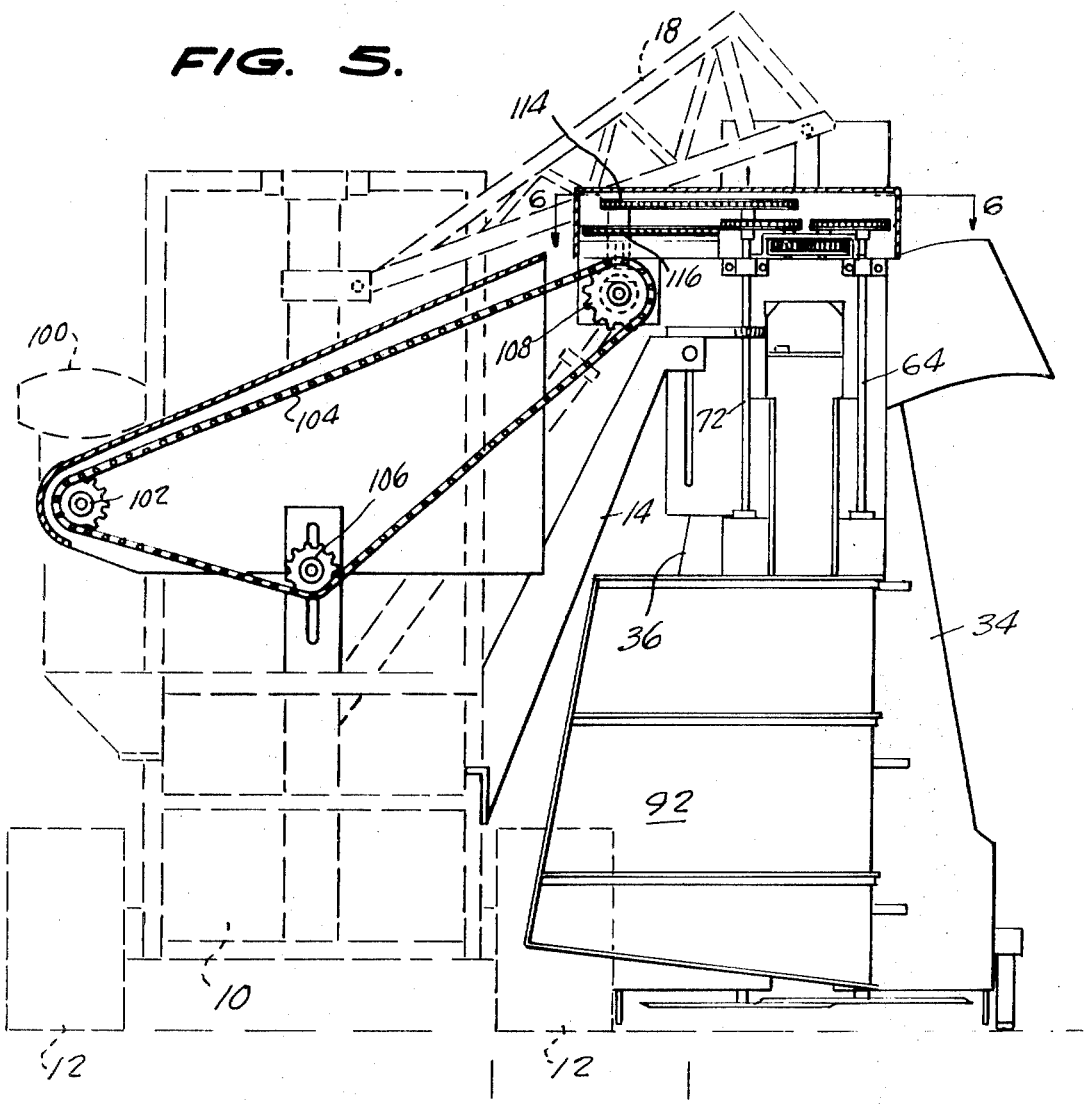
Figure 6:
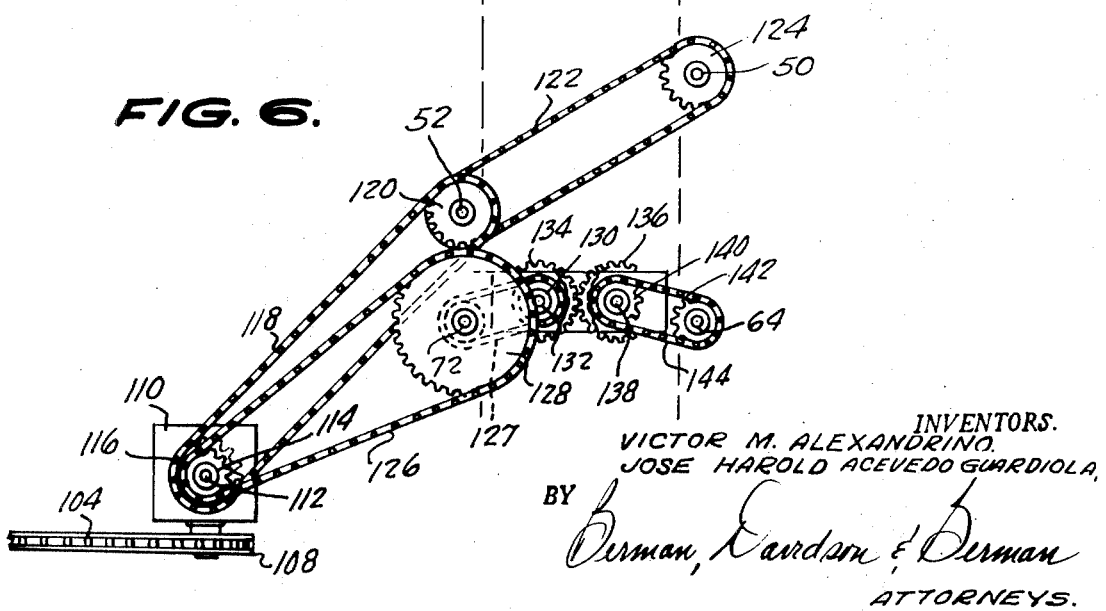

The above and other objects may be made clear from the following detailed description taken in connection with the annexed drawings, in which:

FIG. 1 is a front elevation of the machine;
FIG. 2 is a side elevation of the machine, viewing from the left of FIG. 1;
FIG. 3 is a bottom plan view of FIG. 2;
FIG. 4 is a top plan view partially in section on the line 4—4 of FIG. 2;
FIG. 5 is a rear elevation of the machine of FIG. 1; and
FIG. 6 is a section on the line 6—6 of FIG. 5.

Ripe sugar cane has approximately the following analysis:

|  | Percent |
|---|---|
| Sugar | 10 |
| Fiber | 18 |
| Water | 72 |

With such an analysis, it is very clear that considerable loss may be incurred by virtue of careless cutting or bruising, thus permitting heavy sugar losses of the stalks. In Western Hemisphere practice, so far as the sugar industry is concerned, the most important labor shortage is in cane cutting. Satisfactory apparatus is already in existence for gathering cane after it has been cut and properly placed, but up until now a satisfactory high speed cane cutter which will meet the peculiar problems of sugar cane has not been developed. The present invention is concerned primarily with harvesting of cane to an acceptable length, discharging the cane following passage of the machine in such order as to make it easily picked up by the already acceptable and conventional apparatus and to avoid such damage to the cane as might result from short length cutting with consequent bruising and therefore eliminating the possibility of extended and multiplied inversion of the sugar solution in the stalks.

Referring now to FIG. 1, the improved machine is shown attached to a tractor, indicated generally at 10, the tractor being of small to medium size and preferably of the type having endless drive tracks 12 at each side. A cross member 14 is secured to the frame of the tractor 10, as is a mast 16 to which is pivoted a truss 18. The machine, generally designated 20, is suspended from a link 22 which is pivoted to the free end of the truss 18.

A piston rod 24 is pivoted at one end of the truss 18 and has at its other end a piston operating within a cylinder 26 which also is pivoted to the tractor frame. A guide pin 28 is mounted to slide in a slot 30, in a bracket 32, secured in the machine 20. As the piston 24 is run in and out of the cylinder 26 by normal hydraulic means, the entire machine 20 is raised and lowered to adjust its position relative to ground level.

A pair of plates 34 and 36 diverge in the direction of machine advance and, as seen in FIGS. 1 and 2, each of these plates at its forward end supports, by means of links 38, pivoted at 40 to their respective plates, a cane pick-up wheel 42. Each of the wheels has teeth 44 and, as shown in FIG. 2, rotates in a counterclockwise direction. A skid 46 is secured to each link 38 to limit groundward movement of the wheels 42. The wheels 42 are driven hydraulically by fluid supplied through tubes 48, as best shown in FIG. 2.

Adjacent to plate 34 is a vertical shaft 50, while a similar shaft 52 is mounted adjacent the plate 36. The shaft 50 has at its lower end a serrated cutter disc 54 which mates with a serrated cutter disc 56 on the shaft 52. As best seen in FIG. 3, the cutter discs 54 and 56 are mutually offset in the direction of the machine advance and operate to sever the cane stalks from the ground.

As best seen in FIG. 2, the plate 34 has, adjacent its forward end, a series of bearings in which is mounted a shaft 60. Toward its rearward end a series of bearings 62 are similarly secured to plate 34 and support a vertical shaft 64. The shafts 60 and 64 carry a series of sprockets 66 engaged by sprocket chains 68, each of which chains 68 carries a series of fingers 70 which pass through slots 72 in the plate 34.

A similar arrangement on plate 36 supports sprockets 74 carrying chains 76 through which project fingers 78. In use, fingers 70 and 78 are mutually offset in the direction of advance, as shown in FIGS. 3 and 4.

At its upper end, the shaft 50 is keyed to a disc 80. The shaft 50 is perforated as at 82 to permit vertical adjustment of the disc 80. As best seen in FIG. 4, the disc 80 has a plurality of peripheral cut-outs 82, leaving cutting edges 84 between the cut-outs. The cutting edges 84 engage a vertically adjustable stationary knife 86 to sever cane tops from the body of the cane. The disc 80 also has a plurality of upwardly projecting fingers 88 which swerve to sweep the severed cane tops into a discard chute 90 (FIG. 1) where they are deposited out of the way of the gathering machine for the severed cane. The disposition of the severed and topped stalks will best be understood by reference to FIGS. 3, 4, and 5.

Referring now to FIGS. 3 and 4, it will be noted that the plate 34 terminates in an elongated curved arm extending rearwardly of the machine and toward the tractor which, as seen in FIG. 1, is at the right-hand side of the harvesting machine proper. Similarly, the plate 36 terminates in a short arcuate extension 94 extending generally parallel to the arm 92. The surface of the extension 94 is substantially vertical but the surface of arm 92 is tilted rearwardly of the direction of advance of the tractor. Stalks which have been severed by cutters 54 and 56 and which have been topped by the cutter disc 80 are fed by the fingers 70 and 78 into the chute defined by the extensions 92 and 94 and tend to topple sidewise in the direction of the chute exit. This arranges the stalks and their axes substantially transverse the direction of the advance of the tractor and makes it extremely easy for the stalks to be picked up by conventional gathering mechanism.

Driving means for the various mechanisms heretofore described are best shown in FIGS. 5 and 6. An auxiliary motor 100 is mounted on the tractor frame and drives the sprocket 102. This in turn drives the chain 104 which also passes over an idle tightening pulley 106 to a sprocket 108. The sprocket 108 through bevel gears in housing 110 drives a vertical shaft 112 to which is attached an upper sprocket 114 and a lower sprocket 116. The lower sprocket 116 is connected by a chain 118 to a sprocket 120 secured to the vertical shaft 52 which also carries a sprocket connected by a chain 122 to a sprocket 124 on shaft 50. The upper sprocket 114 is connected by a chain 126 to a large sprocket 128 mounted on a stub shaft 128.

The large sprocket 128 is mounted on the shaft 72 and therefore drives the chain 76 with its fingers 78. A second sprocket on the shaft 72 drives a chain 127 which in turn drives a sprocket 130 on a stub shaft 132. A pinion 134 is also mounted on the stub shaft 132 and meshes with a similar pinion 136 on a stub shaft 138. The second stub shaft 138 carries a sprocket 140 which, by means of a chain 142, drives a sprocket 144 which is secured to a shaft 64, best seen in FIG. 2. The chain 68 with its fingers 70 and the chain 76 with its fingers 78 are driven in opposite directions and tend to feed the stalks toward the rear of the machine and into the chute defined between extension 92 of the plate 34 and extension 94 of plate 36.

Conveniently, but not necessarily, as shown in FIG. 1, if the tractor has a front end power take-off, the take-off may be used to operate a pump 150, feeding lines 48 by which the pickup wheels 42 are driven.

The gearing previously described is such as to provide not only ample peripheral cutting speed for the serrated cutters 54 and 56 but to drive the chains 68 and 76 so that the speed of the fingers very closely matches the speed of forward advance of the tractor. As a result, the cane is not heavily bunched, cut or otherwise compressed by the fingers 70 and 78 and there is a minimum of bruising and premature bleeding of sap by the severed stalks.

If desired, the extensions 92 and 94 might be eliminated and self-loading cane carrier placed directly behind the delivery section of the machine. On most plantations, however, the conventional grabber or gatherer will be preferred.

While certain specific details and arrangements have been disclosed herein by way of illustrating the inventive concept of this application, it is clear that various structural details could be changed without altering the effective operation of the machine and it is not intended, therefore, to limit this invention to the precise details as disclosed.

What is claimed is:

1. A sugar cane harvesting machine adapted to be advanced through a cane field, said machine comprising opposed plates having their leading ends tapering downwardly and diverging in the direction of advance, said diverging portion of said plates being imperforate; a plurality of vertically spaced tiers of conveyor fingers operating through slots in the rearward portion of each of said plates in a direction opposed to the direction of advance of said machine, the fingers of opposed tiers coacting to hold the cane stalks upright; a pair of cutters cooperating adjacent ground level to sever cane stalks extending between said plates; and means above said tiers of fingers for cutting tops from cane stalks supported vertically between said fingers to produce cut and topped stalks of uniform length.

2. A machine as set forth in claim 1, including rotary means attached to each of said plates in advance of said tiers of teeth for raising fallen or flattened cane stalks into the path of said teeth.

3. A machine as set forth in claim 1, including means at the rear of said tiers of fingers for discharging cut and topped cane stalks with the stalk lengths horizontal and transverse the direction of advance.

4. A machine as set forth in claim 3, including means to discharge severed tops in a direction opposite the discharge of said stalks.

5. A machine as set forth in claim 2, in which said rotary means comprise toothed wheels.

6. A machine as set forth in claim 5, in which the axes of said wheels are vertically movable relative to the machine as a whole and includes means to limit the approach of said wheel teeth to ground level.

7. A machine as set forth in claim 1, including means connected to the machine advancing means for vertical adjustment of the machine as a whole toward and from the ground.

8. A machine as set forth in claim 7, in which said adjusting means is hydraulically operated.

References Cited

UNITED STATES PATENTS

| | | | |
|---|---|---|---|
| 1,741,602 | 12/1929 | Athey | 56—17 |
| 2,782,581 | 2/1957 | Thomson | 56—17 |

ROBERT PESHOCK, Primary Examiner